(12) United States Patent
Kuramoto

(10) Patent No.: US 7,602,987 B2
(45) Date of Patent: Oct. 13, 2009

(54) DEFECTIVE PIXEL CORRECTING METHOD, SOFTWARE AND IMAGE PROCESSING SYSTEM FOR IMPLEMENTING THE METHOD

(75) Inventor: Hisakazu Kuramoto, Izumisano (JP)

(73) Assignee: Noritsu Koki Co. Ltd., Wakayama-ken (JP)

( * ) Notice: Subject to any disclaimer, the term of this patent is extended or adjusted under 35 U.S.C. 154(b) by 664 days.

(21) Appl. No.: 11/089,807

(22) Filed: Mar. 24, 2005

(65) Prior Publication Data

US 2005/0213838 A1    Sep. 29, 2005

(30) Foreign Application Priority Data

Mar. 25, 2004   (JP) .............................. 2004-089383

(51) Int. Cl.
*G06T 5/00* (2006.01)
*H04N 1/409* (2006.01)

(52) U.S. Cl. .................... 382/254; 358/3.26; 382/275

(58) Field of Classification Search ................ 382/254, 382/275; 358/3.26
See application file for complete search history.

(56) References Cited

U.S. PATENT DOCUMENTS

| 5,266,805 | A | 11/1993 | Edgar |
| 6,704,458 | B2* | 3/2004 | Ford ............................ 382/275 |
| 6,775,419 | B2 | 8/2004 | Maeda et al. |
| 2001/0031098 | A1* | 10/2001 | Ford ............................ 382/275 |
| 2003/0039403 | A1 | 2/2003 | Robins |
| 2003/0072501 | A1 | 4/2003 | Enomoto |
| 2003/0132384 | A1 | 7/2003 | Sugiyama et al. |
| 2004/0027618 | A1 | 2/2004 | Nakamura et al. |

FOREIGN PATENT DOCUMENTS

| JP | 11-098370 | 4/1999 |
| JP | 2001-14480 | 1/2001 |
| JP | 2001-024883 | 1/2001 |
| JP | 2001-024884 | 1/2001 |
| JP | 2001-024895 | 1/2001 |
| JP | 2001-78038 | 3/2001 |
| JP | 2001-078038 | 3/2001 |
| JP | 2002-300403 | 10/2002 |
| JP | 2003-179750 | 6/2003 |

* cited by examiner

*Primary Examiner*—Samir A. Ahmed
*Assistant Examiner*—Stephen R Koziol
(74) *Attorney, Agent, or Firm*—Fulbright & Jaworski LLP

(57) ABSTRACT

A defective pixel correcting method, for correcting one or more of defective pixels present in visible light image data, the one or more of pixels being determined as defective by using the visible light image data and infrared light image data, the method includes the steps of:
(a) determining one or more of defective pixels based on a first criterion and creating a first defective pixel map;
(b) correcting the one or more of defective pixels by luminance adjustment using the first defective pixel map;
(c) generating and displaying an additional correction setting screen including a visible light image based on corrected visible light image data and an indicator indicative of a quasi-defective pixel area;
(d) creating an additional correction target pixel map which specifies one or more of additional correction target pixels manually set through the additional correction setting screen; and
(e) correcting the one or more of additional correction target pixels by interpolation.

18 Claims, 10 Drawing Sheets

DEFECTIVE PIXEL CORRECTING METHOD, SOFTWARE AND IMAGE PROCESSING SYSTEM FOR IMPLEMENTING THE METHOD

This application claims priority from JP2004-089383 filed Mar. 25, 2004 herein incorporated by reference in its entirety.

BACKGROUND OF THE INVENTION

The present invention relates to a technique for correcting image data and more particularly to a defective pixel correcting technique for correcting one or more of defective pixels present in visible light image data, where the pixels are determined as defective by using the visible light image data read from a photographic film based on a visible light and infrared light image data read from the film based on an infrared light.

A photographic film may have defects such as scratches, dust, dirt, etc., on its surface. There is a known technique available for correcting such defect by means of an image processing operation relying on e.g. a luminance adjustment technique or an interpolating technique when a photographically recorded image is read from such "defective" film to be printed on a print sheet or output on a display.

An example of such known technique corrects defects by adjusting luminance, taking advantage of the unique property of infrared light. That is, unlike the visible light, the infrared light, when irradiated on an exposed photographic film, is hardly affected by a photographic image recorded thereon, but affected only by such physical defect as scratches, dust or the like. More particularly, both infrared light and visible light are transmitted through an exposed photographic film, and the portion of the film where a pixel value of infrared image data is below a predetermined threshold value is determined as a defective portion. Then, to a pixel value of each color component (red (R), green (G), blue (B)) of this defective portion, a correction value is added, which corresponds to an amount of luminance attenuation occurring in the defective portion relative to a normal (non-defective) portion of the film, thereby to increase the luminance. In this way, the pixel value of each color component of the defective portion is adjusted or corrected relative to the normal portion by means of luminance enhancement (see e.g. U.S. Pat. No. 6,775,419).

However, this luminance adjustment technique is based on an assumption that the pixel values of the respective color components of the defective portion have experienced an equal amount of luminance attenuation. For this reason, if the amounts of attenuation in the pixel values of the respective color components differ from each other as may happen in the case of a scratch in an emulsion-applied surface or layer on the film, the above technique cannot correct this defect effectively.

In such case, an interpolation technique may be employed which corrects the defective portion by utilizing pixel values of non-defective, i.e. normal pixels adjacent thereto as reference values for the defect correction. However, if the defective portion includes a boundary (edge) or a pattern of the photographic image recorded on the film, such defective portion cannot be properly corrected by the above technique if it simply applies pixel values of adjacent non-defective pixels to the defective portion for its correction. In an attempt to cope with this problem, there is a known technique which detects a direction along which the image boundary is present and then effects the interpolation along that detected direction. More particularly, along a plurality of differing directions from the defective portion, the technique calculates image "attribute" values such as pixel value difference between normal pixels, a distance between the normal pixels, etc. Further, based on pixel values of the normal pixels present along the plurality of directions, an interpolation value is obtained for each direction. Then, a weighted average value for each direction is calculated by using the image attribute values as a weight, thereby to obtain a final correction value for use in the interpolation. (see for example, Japanese Patent Application No. 2001-78038 (pages 7-8, FIGS. 4-5 and FIG. 8)).

Therefore, in a conventional method for correcting a defective pixel present in visible light image data where pixels are determined as defective by using the visible light image data and infrared light image data, this is generally done by correcting defective pixels by using the luminance adjustment technique first and then effecting defective pixel correction by using the interpolation technique. In either the luminance adjustment technique or the interpolation technique, the correction is preceded by an automatic determination of a defective pixel based on a predetermined defect criterion. However, a certain defect actually present on a photographic film can be left undetected by such defect criterion. As a result, the defect can remain uncorrected at all or be corrected only in an unnatural way. For this reason, if needed, the automatically corrected image data is displayed on a monitor for the operator to locate any pixel which requires additional correction. This manual operation for locating pixels requiring additional correction demands significant skill and patience on the part of the operator.

SUMMARY OF THE INVENTION

In view of the above-described state of the art, a primary object of the present invention is to provide a technique which facilitates the manual operation for determining a defective pixel requiring additional correction after an automatic correction of the defective pixel.

For accomplishing the above-noted object, according to one aspect of the present invention, there is proposed a method for correcting one or more of defective pixels present in visible light image data, the one or more of pixels being determined as defective by using the visible light image data and infrared light image data, the method includes the steps of:

(a) determining one or more of defective pixels based on a first criterion and creating a first defective pixel map;

(b) correcting the one or more of defective pixels by luminance adjustment using the first defective pixel map;

(c) generating and displaying an additional correction setting screen including a visible light image based on corrected visible light image data and an indicator indicative of a quasi-defective pixel area;

(d) creating an additional correction target pixel map which specifies one or more of additional correction target pixels manually set through the additional correction setting screen; and (e) correcting the one or more of additional correction target pixels by interpolation.

With the above-described method, the monitor displays an image based on image data automatically corrected by the luminance adjustment technique (suitable for correction of a pixel defect due to a scratch on a film base surface commonly known as a base scratch or dust adhering to the film surface) together with an indicator indicative of an area of a quasi-defective pixel which is suspected as being defective (the indicator can be, for example, a contour of the area or coloring delimiting the area). Then, with the aid of this indicator, the operator can easily select and set an additional correction target pixel. The method creates an additional correction target pixel map which specifies this set additional correction target pixel by e.g. coordinates thereof and effects the interpolation correction (more suitable for correcting pixels caused by scratches on a emulsion-applied surface) based on this additional correction target pixel map. Namely, based on the observation that defective pixels due to emulsion scratches are less common than defective pixels due to base scratches, the method indicates a quasi-defective pixel area suspected of presence of a defective pixel due to emulsion scratch for allowing the operator's manual judgment.

DETAILED DESCRIPTION OF THE PREFERRED EMBODIMENTS

Figure 1:
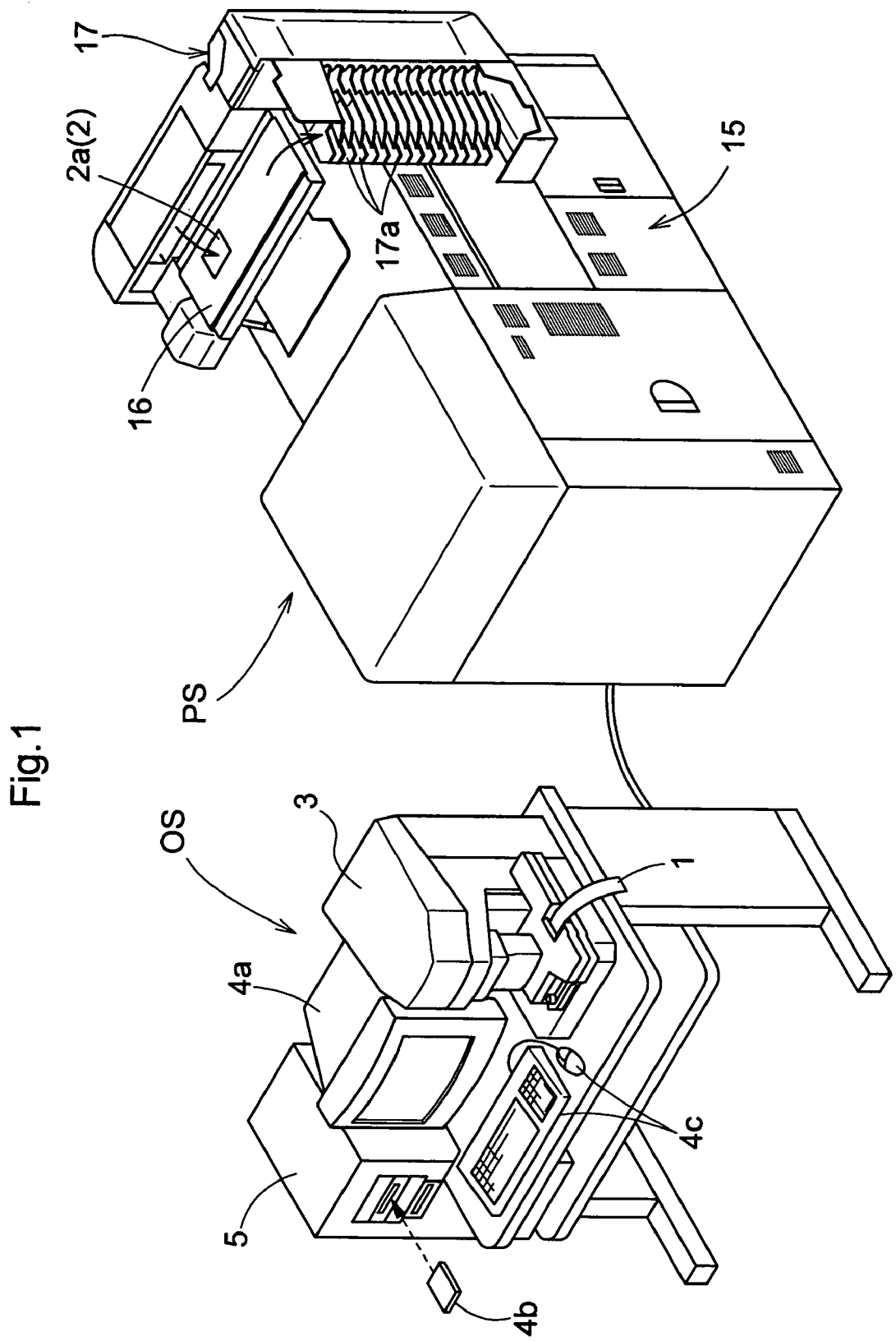
FIG. 1 shows an appearance of a photographic printing system incorporating an image reading device with a defect correcting function implementing a position adjustment technique relating to the present invention.

FIG. 1 shows appearance of an image printing system implementing a defective pixel correcting system based on a defective pixel correcting technique relating to the present invention. This image printing system includes a control station OS having an image reading device 3 for reading a photographically recorded image in each frame of the photographic film 1 (to be referred to simply as "film" hereinafter) developed by an unillustrated film developing device as digital image data, a controller 5 configured for generating print data by effecting an image processing operation on the acquired image data, etc. The photographic printing system further includes a printing station PS for effecting an exposing operation and a developing operation on a print paper 2 based on print information from the control station OS to make photo prints 2a. The controller 5 is comprised basically of a general-purpose personal computer and incorporates the defective pixel correcting system of the invention. This personal computer includes a monitor 4a for displaying operation screens of this photographic printing system, a media reader 4b for reading image from e.g. a memory card of a digital camera, a keyboard 4c used for operator's input operation, etc.

Figure 2:
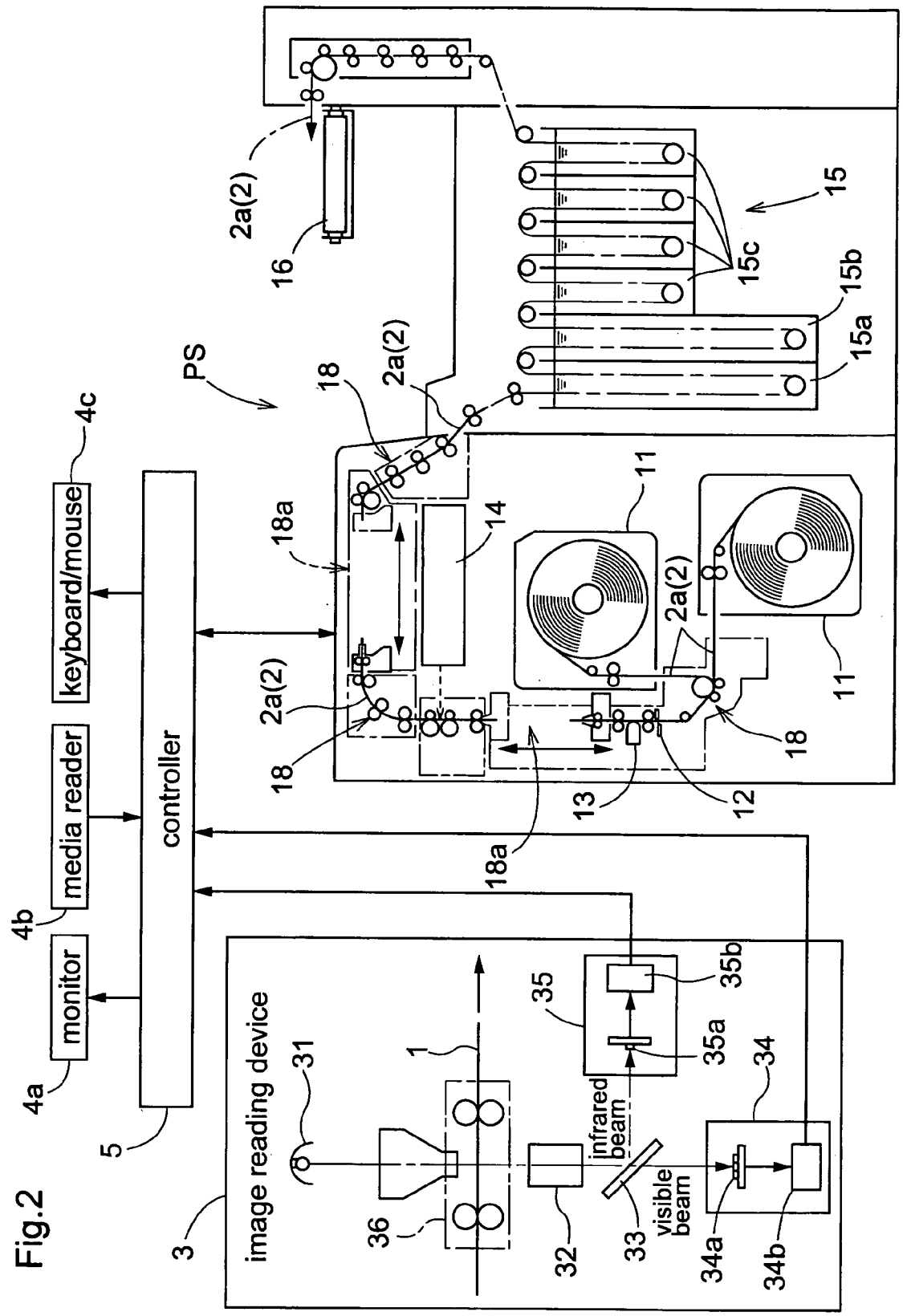
FIG. 2 is a schematic construction diagram of the photographic printing system.

In the printing station PS, as shown in FIG. 2, a print paper in the form of roll stored in each of two print paper magazines 11 is drawn out and then cut by a sheet cutter 12 into a print size. On a back face of this cut print paper 2, a back printing unit 13 prints various print processing information including color correction information, a serial frame number, etc. Further, an exposure printing unit 14 effects an exposure of the front face of the print paper 2 with a photographic image. Then, this exposed print paper 2 is introduced for its development to a developing tank unit 15 having a plurality of developing solution tanks. After being dried, the print paper 2 is sent from a transverse conveyer 16 disposed at an upper portion of the station to a sorter 17 (see FIG. 1), in which a plurality of print papers 2, i.e. photo prints 2a, are stacked on a plurality of trays 17a of this sorter 17 as being sorted out in the storage unit of customer's order.

Further, there is provided a print paper transporting mechanism 18 for transporting the print paper 2 at a transporting speed suitable for each processing. The print paper transporting mechanism 18 consists essentially of a plurality of pairs of pinched-transport rollers including chucker type print paper transport units 18a disposed forwardly and rearwardly of the exposure printing unit 14 relative to the transporting direction of the print paper.

The exposure printing unit 14 includes line exposure heads for effecting irradiation of laser beams of three R, G, B primary colors along a main scanning direction on the print paper 2 being transported in a sub scanning direction, based on the print data transmitted from the control station OS. The developing tank unit 15 includes a color development tank 15a reserving therein a color developing solution, a bleaching-fixing tank 15b reserving therein a bleaching-fixing solution and a stabilizing tank 15c reserving therein a stabilizing solution.

The image reading device 3 is a so-called film scanner having components required for scratch or defect correction. This device 3 or scanner includes, as principal components thereof, an illuminating optical unit 31, an imaging photographic unit 32 comprising e.g. a zooming lens, a dichroic mirror 33 for separating an incident beam into a visible light and an infrared light, a visible light sensor unit 34, and an infrared light sensor unit 35. The illuminating optical unit 31 includes a halogen lamp or a light-emitting diode as a light source, a mirror tunnel for modulating the light or beam from the light source, and a diffuser plate, etc. The visible light sensor unit 34 includes three CCD arrays 34a having color filters adapted for detection of respective color components R (red), G (green) and B (blue) together constituting the visible light image, and a visible light signal processing circuit 34b adapted for processing respective visible light signals acquired by these CCD arrays 34a to produce image data relating respectively to the R beam component, G beam component and B beam component and then sending these data to the controller 5. Further, in order to detect a scratch or any physical damage which may be present in the photographic film 1 as an infrared image, the infrared light sensor unit 35 includes a CCD array 35a arranged for receiving only the infrared light separated by the dichroic mirror 33 and an infrared signal processing circuit 35b for processing infrared signals acquired by the CCD array 35a to produce infrared image data and then sending these data to the image processing apparatus 1.

With the image reading device 3 having the above-described construction, when a photographic image recorded flame of the photographic film 1 is fixed in position at a predetermined reading position, the reading operation of this photographic image is initiated. In this, a projection image of the photographic image of the frame is read in the form of a plurality of discreet slit images by the visible light sensor unit 34 first and then by the infrared light sensor unit 35 according to a feeding operation of the photographic film 1 along an auxiliary scanning direction by a film transport mechanism 36, through which the image is subjected to photoelectric conversions into image signals of the respective R, G, B color components and image signals of infrared components, respectively. Then, these signals are all transmitted as the "raw" digital image data to the controller 5. The control operations by the illuminating optical unit 31, the imaging optical unit 32, the visible light sensor unit 34 and the infrared light sensor unit 35 to realize the above-described operations thereof are effected according to operation instructions from the controller 5.

The controller 5 has a CPU as a principal component thereof, which includes various functional units or sections for effecting various operations on inputted data, implemented in the form of hardware and/or software.

Figure 3:
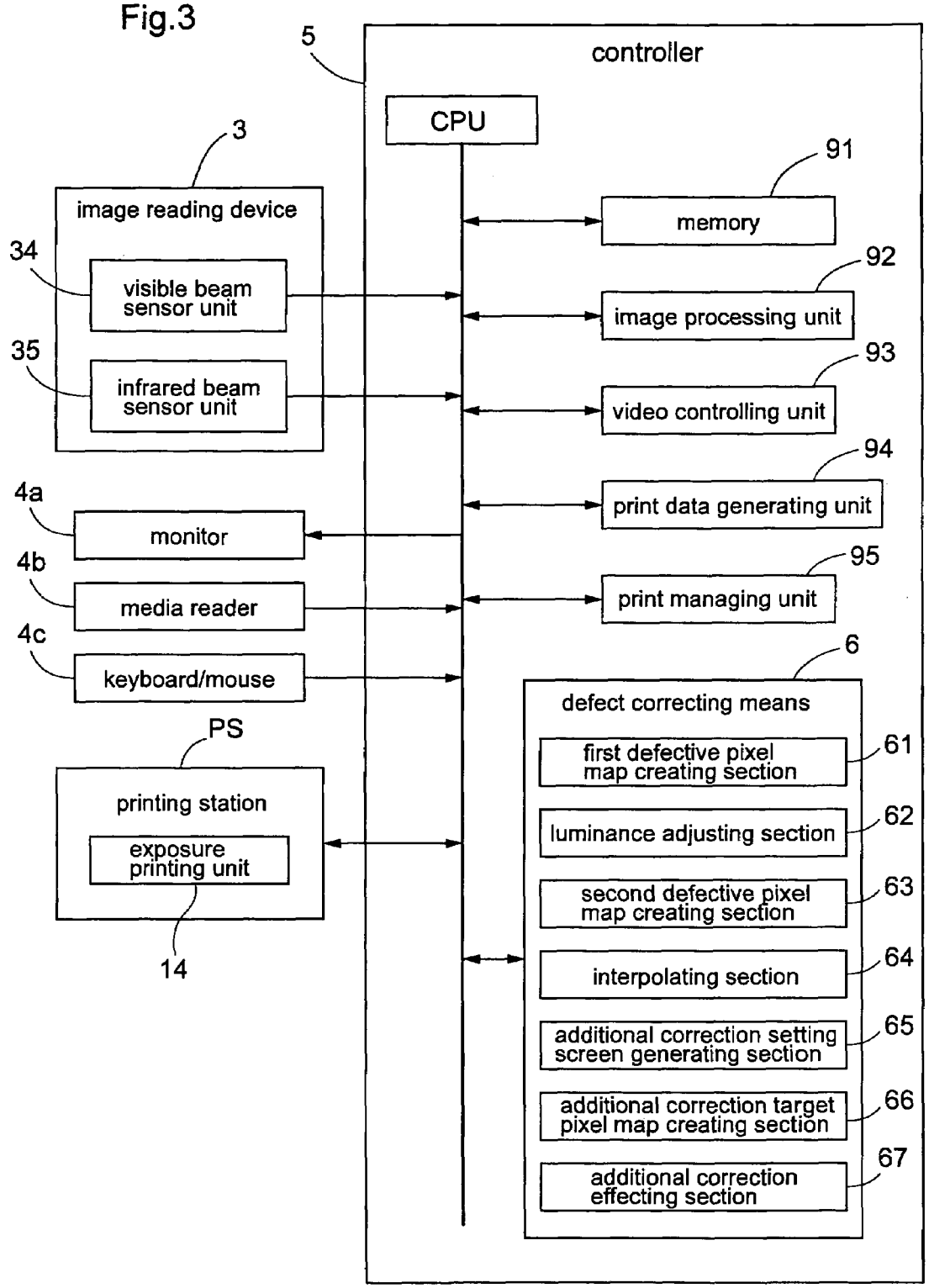
FIG. 3 is a functional block diagram of a controller.

Those functional units particularly pertinent to the present invention will be described with reference to FIG. 3. A defect correcting means 6 is provided for effecting correction of a defect in a pixel due to a scratch or dust (to be detailed later) present on the film 1, by using visible light image data obtained by the visible light sensor unit 34 from the film 1 and then stored/mapped in a memory 91 and infrared light image data obtained by the infrared light sensor unit 35 and the stored/mapped also in the memory 91. An image processing unit 92 is provided for effecting various image processing operations, other than the defective pixel correction, on the visible image data mapped in the memory 91, including a color tone correction, a filtering (shading, sharpness adjustment or the like), a trimming, etc. Further, a video controlling unit 93 is provided for inputting the image data and other display items into a video memory and also converting the image mapped in the video memory into video signals by means of a video controller and then sending these video signals to the monitor 4a. A print data generating unit 94 is provided for converting the respective final image data processed respectively by the image processing unit 92 into the print data and then transmitting these data to the exposure printing unit 14 of the printing station PS. A print managing unit 95 is provided for controlling the various functional units in accordance with operational instructions inputted by the operator via e.g. the keyboard 4c under the operation screen created by using a graphical user interface (GUI) or operational instructions programmed in advance.

Figure 4:
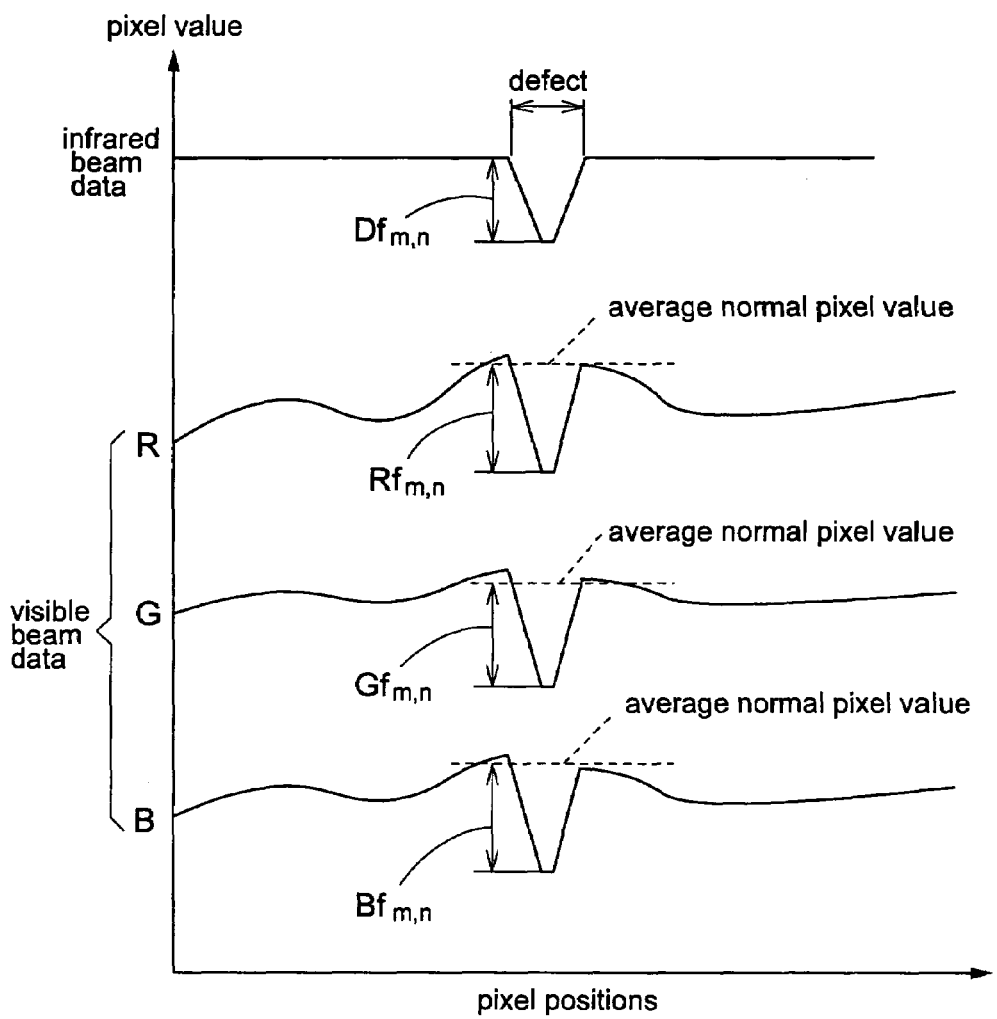
FIG. 4 is a schematic explanatory view of luminance adjustment technique.

The defect correcting means 6 has two defect correcting functions, i.e. a function of correcting or repairing a defective pixel based on the luminance adjustment technique and a further function of correcting or repairing a defective pixel based on the interpolation technique. Referring more particularly to the luminance adjustment operation, a difference between an average of pixel values of all normal pixels included in the infrared light image data and a pixel value of each defective pixel included also therein is used as an attenuation amount in the pixel value of the defective pixel due to a scratch and this amount is added as a gain to the pixel value for each color component (RGB) of each pixel included in the visible image data. In this way, luminances of all defective pixels included in the visible light image data are adjusted. Various algorithms for this technique are known (see. Japanese Patent Application "Kokai" No. 2000-115464, page 5 and FIG. 3 thereof, Japanese Patent Application "Kokai" No. 2001-078038, see its pages 16-17 and FIG. 10, etc.) According to an algorithm employed in the instant embodiment, as schematically shown in FIG. 4, an infrared light defect depth $Df_{m,n}$ is calculated based on a difference between a pixel determined as defective in the infrared light data and a pixel value of an adjacent normal pixel and also visible light defect depths $Rf_{m,n}, Gf_{m,n}, Bf_{m,n}$ are calculated based on a difference between a pixel value of a corresponding pixel in the visible image data for each of the R beam, G beam and B beam and a pixel value of a normal pixel present adjacent the defective pixel. Then, based on these, there is calculated a correction coefficient for compensating for a deviation or difference between the influence on the visible light data from the defect and the influence on the non-visible (infrared) beam data, which deviation results from a wavelength difference or a refractive indicator difference between the visible light and the infrared light. Then, based on this correction coefficient and the infrared light defect depth $Df_{m,n}$ of each defective pixel, luminance of this defective pixel is corrected.

Referring next to the basic principle of the interpolation operation, a threshold value is obtained in advance based on the average value of the pixel values of all pixels included in the infrared light image data. If a pixel in the infrared light image data has a pixel value exceeding this threshold value, a corresponding pixel in the visible light image data is determined as a defective pixel. Then, the technique obtains a distance between this defective pixel and each of a plurality of normal pixels present around it. According to the resultant distances, a weighted average of the pixel values of the normal pixels is obtained as a correction value (interpolation value) for the defective pixel. In the instant embodiment, as will be detailed later, for each defective pixel, an interpolation value is obtained based on pixel values of normal pixels present along a plurality of directions of search lines, and also based on pixel values of normal pixels present on each direction, a weight coefficient for that direction is obtained. Then, by using this, a weighted average is calculated for use in the interpolating correction of the defective pixel.

The defect correcting means 6 includes the following sections. A first defective pixel map creating section 61 is provided for determining one or more of defective pixels based on a first criterion and creating a first defective pixel map. A luminance adjusting section 62 is provided for correcting the one or more of defective pixels by luminance adjustment using the first defective pixel map. A second defective pixel map creating section 63 is provided for determining one or more of defective pixels based on a second criterion and creating a second defective pixel map. An interpolating section 64 is provided for correcting the one or more of additional correction target pixels by interpolation using the second defective pixel map. An additional correction setting screen generating section 65 is provided for generating and displaying an additional correction setting screen including a visible light image based on corrected visible light image data corrected by the luminance adjustment and the interpolation and a contour indicative of a quasi-defective pixel area. An additional correction target pixel map creating section 66 is provided for creating an additional correction target pixel map which specifies one or more of additional correction target pixels manually set by an operator through the additional correction setting screen. And, an additional correction effecting section 67 is provided for correcting the one or more of additional correction target pixels by interpolation using the additional correction target pixel map. Incidentally, the interpolating section 64 and the additional correction effecting section 67 are substantially identical to each other, except that the former obtains the data of the subject defective pixel from the first defective pixel map whereas the latter obtains the data from the additional correction target pixel map.

Figure 5:
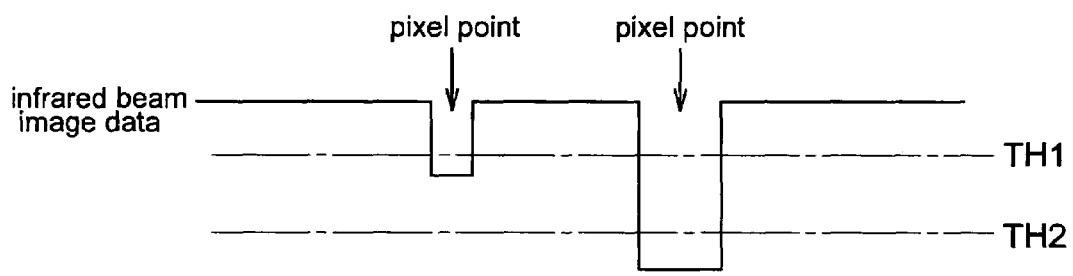
FIG. 5 is an explanatory view illustrating one example of a defect criterion.

Very briefly, as shown in FIG. 5, the first criterion is a defect criterion for determining a pixel as a defective pixel to be subjected to the luminance adjustment if the pixel has a pixel value exceeding a first threshold value TH1 set based on an average of pixel values of all pixels included in the infrared light image data. The second criterion can be considered as a defect criterion which determines a pixel as a defective pixel to be subjected to the luminance adjustment if the pixel has a pixel value exceeding a second threshold value TH2 which is more strict than the first threshold value TH1. That is, as the second criterion is more strict than the first criterion, a defective pixel determined as defective based on the second criterion is always a defective pixel determined as defective based on the first criterion. Hence, of those pixels corrected by the luminance adjustment using the first defective pixel map, the pixel values of the defective pixels included in the second defective pixel map will be replaced or overwritten by corrected pixel values obtained by the interpolating operation. Needless to say, the first criterion and the second criterion can be set independently of each other so that the first criterion and the second criterion may vary according to the area.

Figure 6:
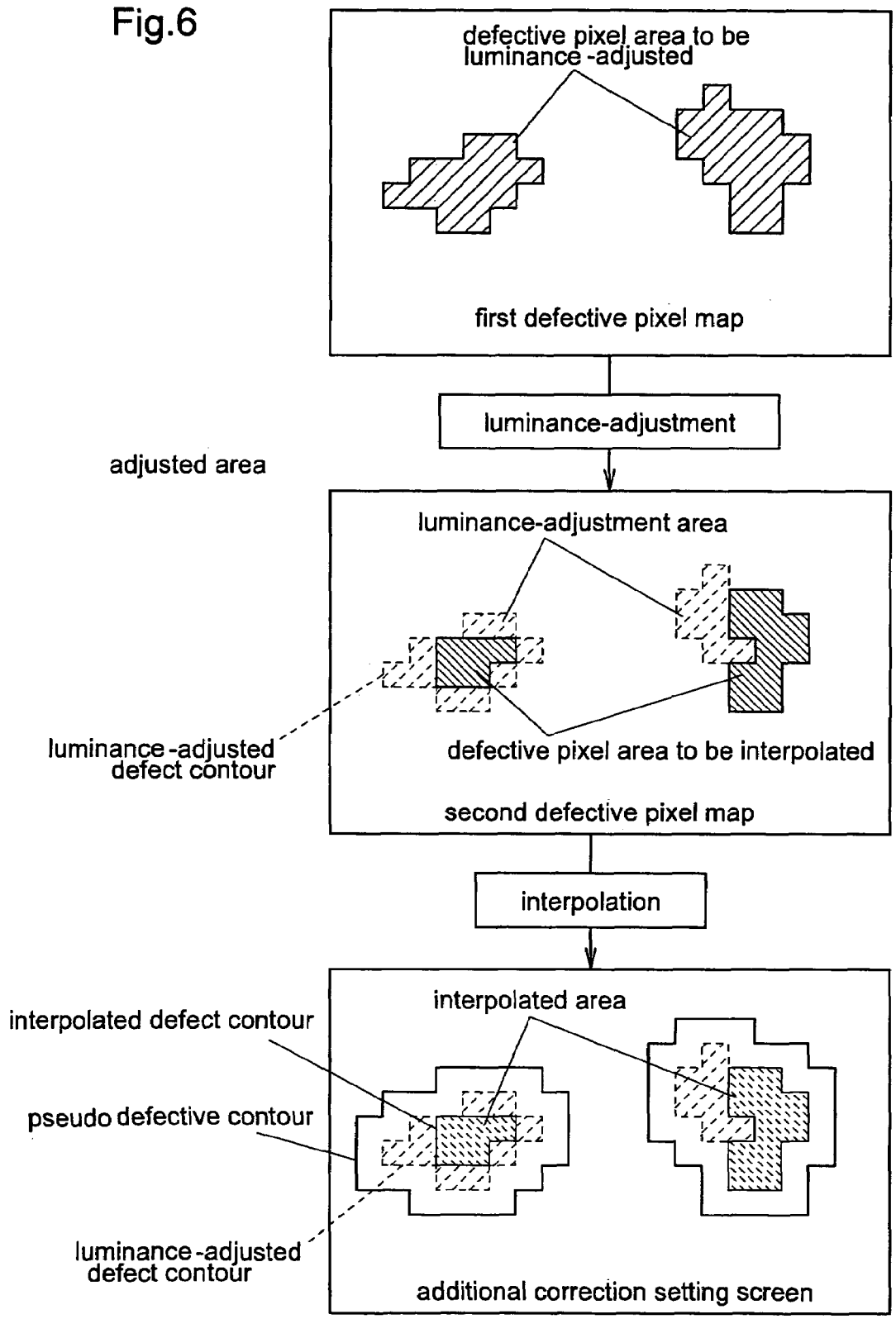
FIG. 6 is an explanatory view illustrating generation of an additional correction setting screen.

As can be seen from the schematic of FIG. 6, the additional correction setting screen generating section 65 employed in this embodiment is adapted for creating an additional correction setting screen which displays a luminance-adjusted defect contour indicative of an area of defective pixels which were determined as defective based on the first criterion and then corrected by the luminance adjustment, an interpolated defect contour indicative of an area of defective pixels which were determined as defective based on the second criterion and then corrected by the interpolation and a quasi-defective contour, together with an image corrected by both the luminance adjustment and the interpolation. The quasi-defective contour, in this embodiment, can be a contour formed by extending, by a predetermined number of pixels, a pixel area determined as defective based on the first criterion, that is, the contour of the defective pixels which were luminance adjusted. However, in case the first criterion and the second criterion are set independently of each other, the quasi-defective contour can be formed advantageously by a combination of the contour of the area extended by a predetermined number of pixels from the pixel area determined as defective based on the first criterion and the contour of the area extended by a predetermined number of pixels from the pixel area determined as defective based on the second criterion. Needless to say, instead of such respective contours, it is also possible to make the subject areas visually distinct from each other by means of coloring.

Next, with reference to FIG. 7, there will be described a process of defective pixel correction by using the defect correcting means 6 constructed as above for correcting one or more of defective pixels contained in the visible image data determined as defective based on the visible light image data read from the film 1 based on the visible lights and the infrared light image data read from the same based on the infrared light.

First, the visible light image data and the infrared light image data obtained respectively by the visible light sensor unit 34 and the infrared light sensor unit 35 of the image reading device 3 are inputted to the memory 91 (step #101). Then, the first defective pixel map creating section 61 effects the determination of defective pixels based on the first criterion and creates the first defective pixel map in which normal pixels and defective pixels are registered with respective coordinates thereof (step #102). Next, the luminance adjusting section 62 effects correction of the defective pixels by the above-described luminance adjustment wherein each defective pixel is specified by using the first defective pixel map and an infrared attenuation amount of the defective pixel relative to normal pixels is added to a pixel value for each color component (red (R), green (G), blue (B)) of the defective pixel (step #103). Similarly, the second defective pixel map creating section 63 effects the determination of defective pixels based on the second criterion and creates the second defective pixel map in which normal pixels and defective pixels are registered with respective coordinates thereof (step #104). Next, the interpolating section 64 specifies one target defective pixel after another from this second defective pixel map and effects the correction of these defective pixels by using an interpolation algorithm to be described later (step #105).

Figure 8:
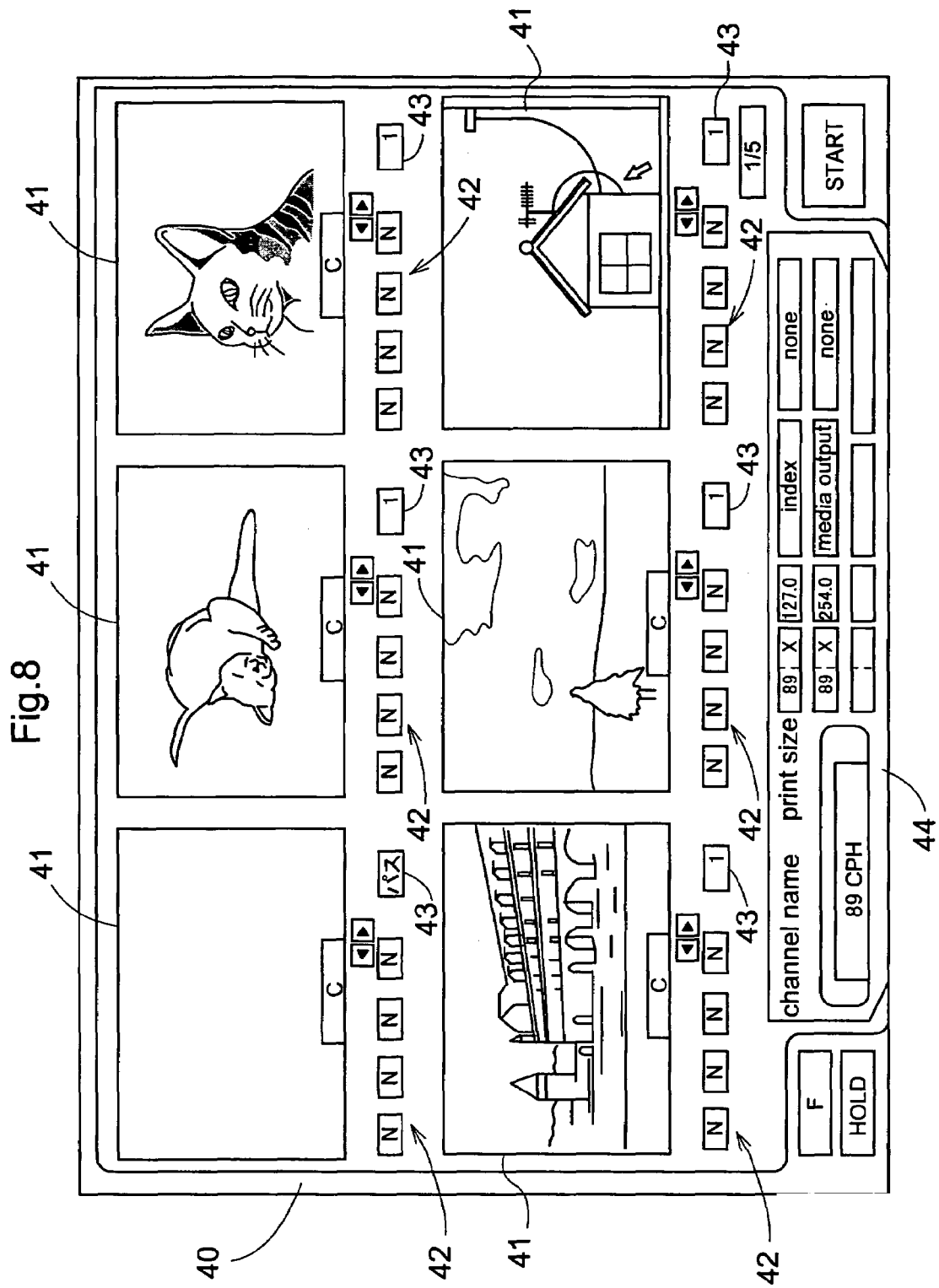
FIG. 8 shows a prejudging screen to be displayed on a monitor.

The visible light image data which were mapped in the memory 91 and subjected to the automatic correction of defective pixels due to a scratch, a dust or the like on the film 1 by the luminance adjustment and the interpolation are displayed one after another in respective image display frames 41 of an operational input screen 40 referred to as "prejudging screen" herein for allowing checking of each frame image. In the example of FIG. 8, a six-frame display screen is selected. Under each image display frame 41, there are arranged a color density correction setting area 42 and a print number setting area 43. The color density correction setting area 42 includes setting boxes of "yellow", "magenta", "cyan" and "density" and a correction amount "N" means neutral, i.e. no correction. The print number setting area 43 includes a print number inputting box and the language "PASS" shown in the box means no printing is to be effected on this frame image. At the lower area of the prejudging screen 40, there is provided a print condition display column 44 which shows a name of "print channel" (a predetermined set or series of print control operations) selectively applied to this particular photo print output, print sizes included in this print channel, need or no-need of indicator printing, need or no-need of media output, etc. The print size represents the size of a finished photo print P. In this embodiment, the print size is determined by a width of the print paper and a feeding length of the same. Upon completion of various settings of the various correction settings, the print number setting for each photographic frame image in this prejudging screen 40, the corresponding image data are transmitted to the print data generating section 94 to be converted into the print data.

Figure 9:
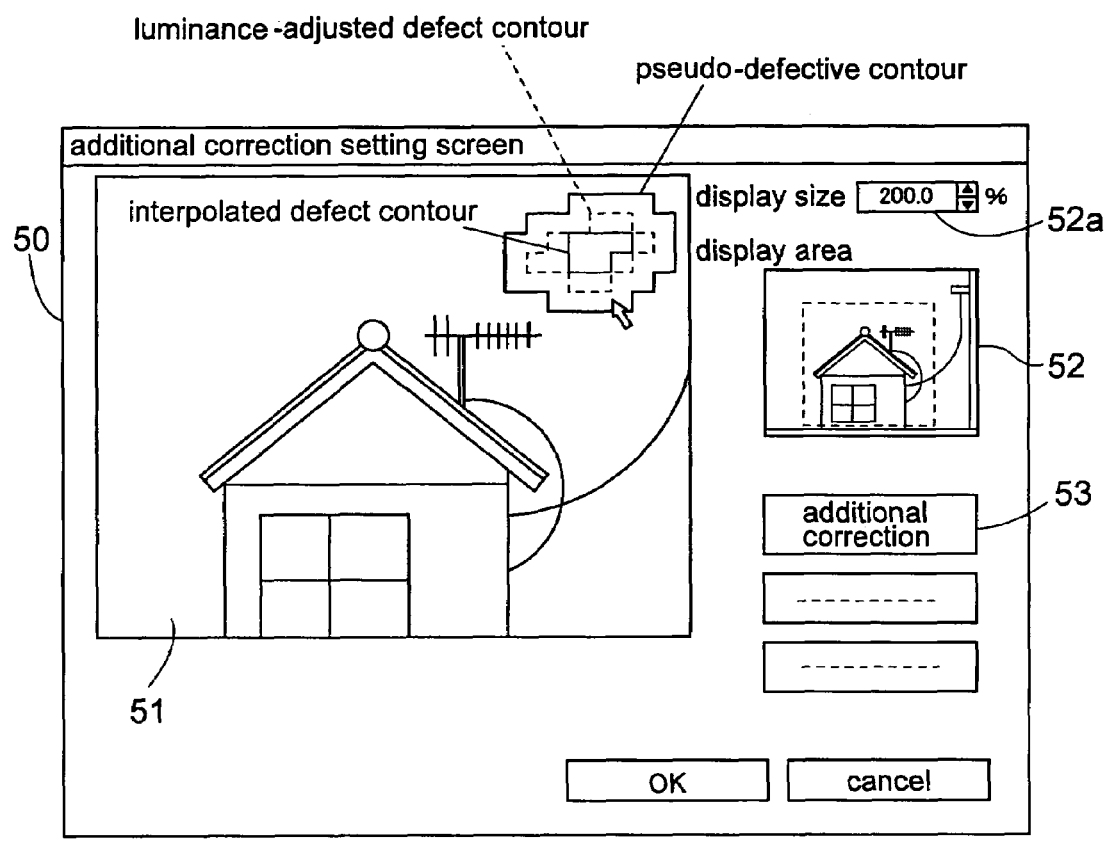
FIG. 9 shows the additional correction setting screen to be displayed on the monitor.

If the plural frames displayed on the monitor 4a includes an image frame whose automatic defect corrections described above are considered insufficient or which requires an additional manual defect correction (YES at step #107), the operator will double-click such frame, whereby the additional correcting setting screen 50 exemplarily shown in FIG. 9 will be generated and displayed on the monitor 4a (step #108). At the center of this additional correction setting screen 50, there is provided an enlarged image display area 51. And, adjacent the right end of the screen, there are arranged a display confirming area 52 for showing the area within the frame image and currently displayed in an enlarged scale in the enlarged image display area 51 by encircling the area in a box of dot line and various correction buttons such as an additional correction button 53. In this enlarged image display area 51, the frame image is shown with addition of the luminance adjusted defect contour, the interpolated defect contour and the quasi-defective contour as schematically shown in FIG. 6. In order to display this image, the quasi-defective contour is automatically created by the method described hereinbefore. The operator can change the area to be displayed in the enlarged image display area 51 by moving the box of dot line in the display confirming area 52 by manipulating the mouse 25.

Further, by changing a magnification in the display size area 52*a*, the operator can enlarge/reduce the image displayed in the enlarged image display area 51. If the operator selects an additional correction target pixel in this additional correction setting screen 50 by manipulating the mouse 25 (YES at step #109), there is created the additional correction target pixel map which specifies e.g. the coordinates of the selected additional correction target pixel (step #110). Subsequently, the additional correction effecting section 67 provides an operation command to the interpolating section 64, which then specifies e.g. the coordinates of one target pixel after another from the additional correction target pixel map and effects the additional correction thereon (step #111). Upon completion of this additional correction, based on these additionally corrected image data, a revised additional correction setting screen 50 is created and displayed on the monitor 4*a* (step #108) to prompt the operator to decide whether any further correction is needed or not. If no further correction is needed (NO at step #109), this routine is ended.

Figure 10:
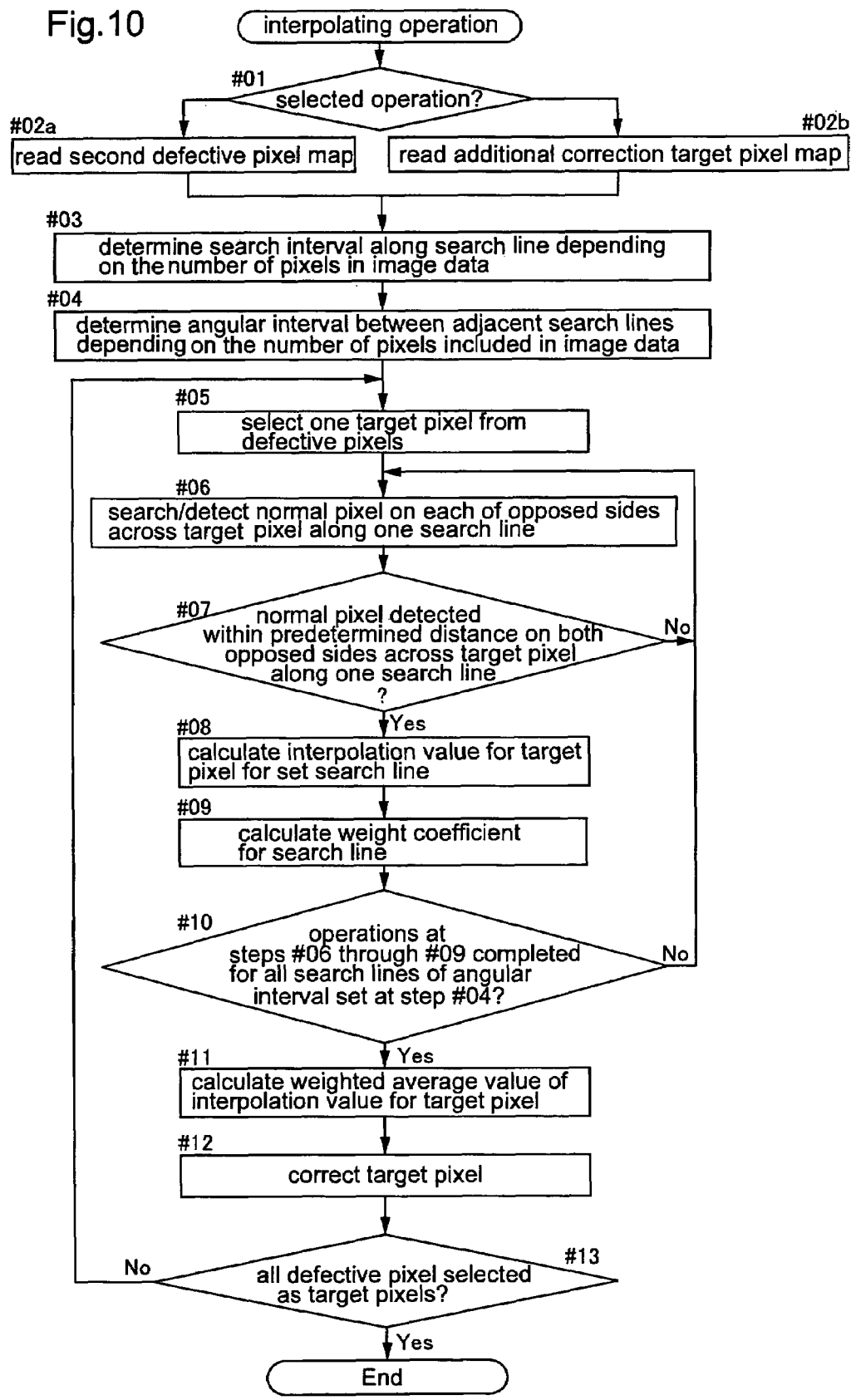
FIG. 10 is a flowchart of an interpolating operation.
Figure 11:
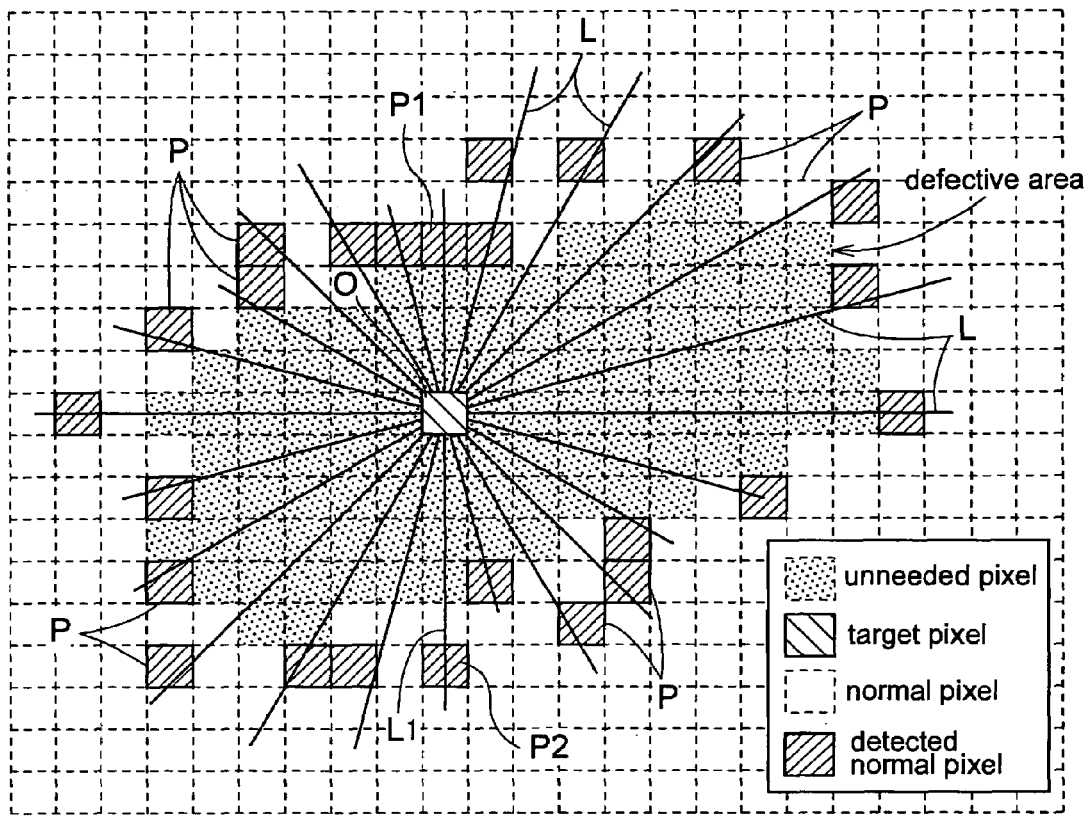
FIG. 11 is an explanatory view illustrating one example of an operation included in the interpolating operation for detecting normal pixel along a plurality of search lines extending through a single target pixel.
Figure 12:
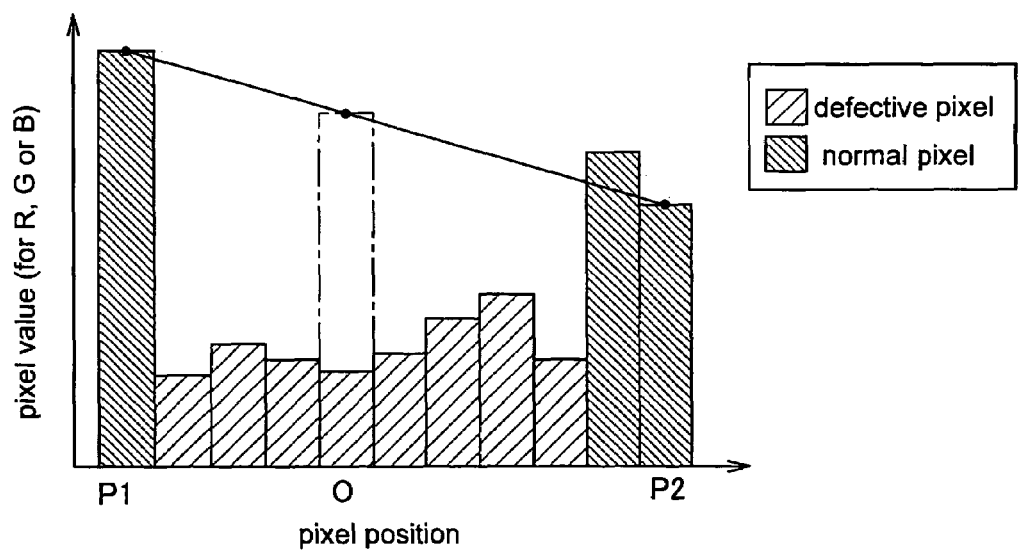
FIG. 12 is a graph showing an example of a method of calculating an interpolation value of a target (defective pixel) in the interpolating operation.

Next, the interpolation algorithm adopted by the interpolating section 64 of this embodiment will be described with reference to FIGS. 10-12.

Figure 7:
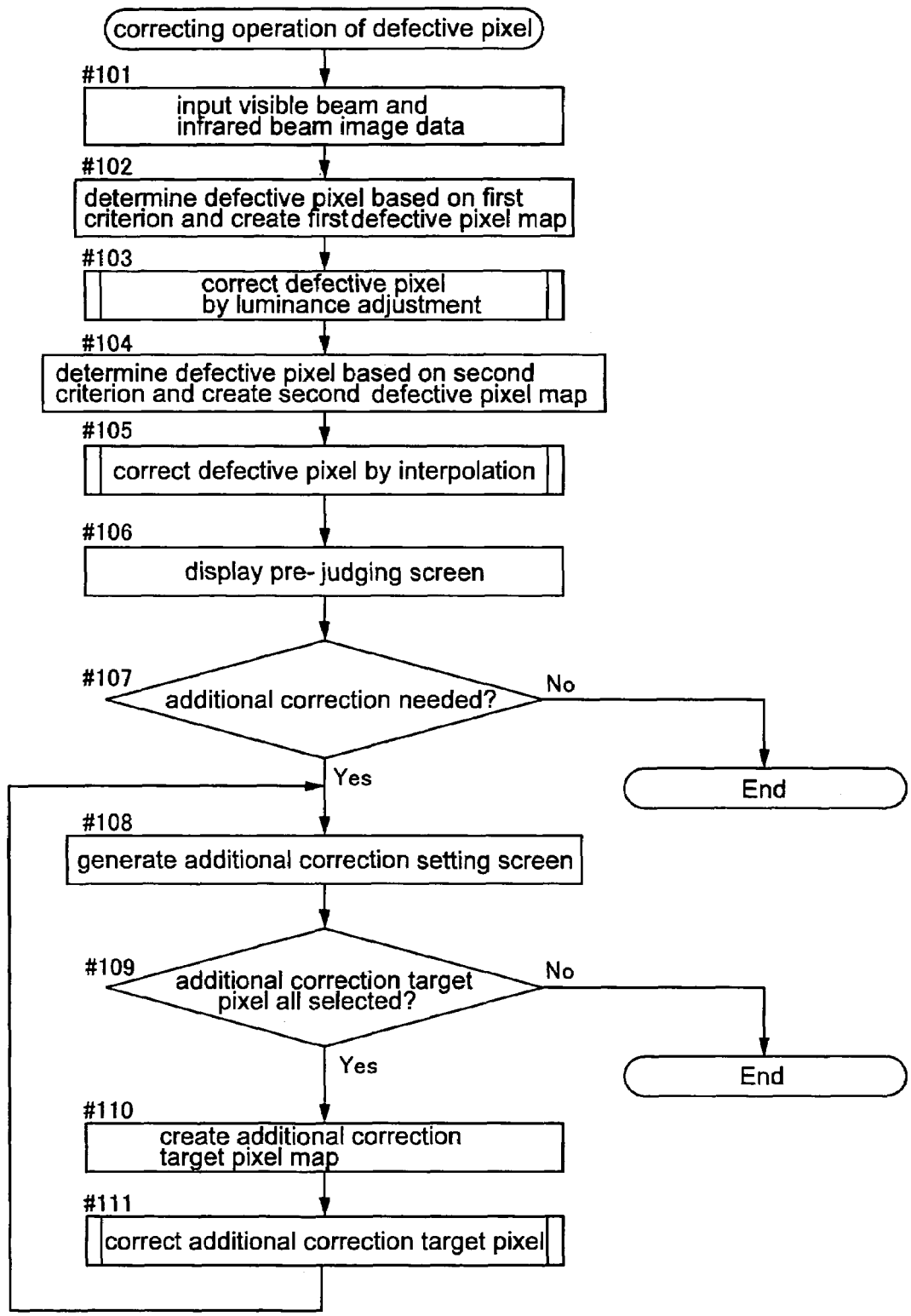
FIG. 7 is a flowchart of a defective pixel correcting operation.

First, the process checks whether this interpolating operation is an operation at step #105 or an operation at step #111 in FIG. 7 (step #01). If this is an operation at step #105 (i.e. an interpolating operation), the process reads the second defective pixel map (step #02*a*). Whereas, if it is an operation at step #111 (i.e. an additional correction), the process reads the additional correction target pixel map (step #02*b*). Further, based on e.g. the number of pixels included in the imaged data or an image resolution, the process determines a search increment along each search line L for searching/detecting normal pixels P (step #03) and determines also an angular interval between adjacent search lines L for normal pixel searching/detection (step #04).

Next, using the read pixel map, target pixels O are selected one after another from those pixels determined as defective pixels (in the following discussion, the additional correction target pixels will also be referred to as defective pixels) (step #05). According to the determined angular interval between adjacent search lines L, the process sets a plurality of search lines L extending through each target pixel O. And, the process searches and detects a normal pixel P on each of the opposed sides across the target pixel O along each search line L extending in one direction (step #06). The search increment for searching/detecting normal pixels P along the search line L is the search increment determined at step #04. FIG. 11 shows an example of the process for detecting the normal pixels P along a plurality of search lines L extending through the target pixel O. In this illustrated example, the search increment determined at step #04 is "2" and the angular interval between adjacent search lines L is "15 degrees". In this, one search line L consists of two opposed segments across the target pixel O extending in the opposite directions therefrom and present on one straight line of the plurality of radially extending directions about the target pixel as the center.

In searching and detecting normal pixels P along the search lines L, except for the cases of the adjacent search lines L having an angular interval of 90 degrees or 45 degrees, the search line L does not necessarily extend through the centers of all the pixels. Then, in such case, a pixel whose center is closest to its corresponding portion on the search line L will be interpreted as a pixel present on that search line L. This searching/detecting operation of normal pixels P is effected by the predetermined search increment on pixels present on the search line L including those pixels which are interpreted as above. In the example shown in FIG. 11, the search increment is "2". Therefore, every other pixel from the target pixel O to the outer side along the search line L will be checked and determined whether it is a defective pixel or a normal pixel. And, among those normal pixels, the one closest to the target pixel O will be detected as the normal pixel P on each side across the target pixel O along that search line L. Incidentally, in this particular embodiment, one such normal pixel P is detected on each side across the target pixel O along one search line L1, so that by using pixel values of these normal pixels P, calculations will be effected later for obtaining an interpolation value H for the target pixel O and a weight coefficient W. In this regard, it is also possible to search and detect two or more normal pixels P on each side across the target pixel O, so that the subsequent calculations of the interpolation value H for the target pixel O and the weight coefficient W may be effected by using an average value of these two or more normal pixels P. Further, the searching/detecting operation of the normal pixels P need not be effected exactly on/along or substantially on/along the search line L. Instead, this operation may be effected for pixels including those located in the vicinity of the search line L.

Then, after the searching of the normal pixels P along the one search line L described above, the process determines whether a normal pixel P has been detected on each of the opposed sides of the target pixel O within the predetermined distance therefrom (step #07). This is done because a value of a normal pixel P away from the target pixel O is not suitable for use in the correction of the target pixel O. Hence, if no normal pixel P is present within the predetermined distance, values of normal pixels P present along that search line L will not be used for the calculations of the interpolation value H for the target pixel O and the weight coefficient H. Therefore, if no normal pixel is detected within the predetermined distance even on either one side across the target pixel O (NO at step #07), then, the process returns to step #06 to detect normal pixels P along a next one search line L. In this, the predetermined distance may be a desired constant value represented simply by the distance (the number of pixels), such as "25" (twenty five) pixels or may be a value variable according to the number of pixels contained in the image data, by using e.g. a table in which the total number pixels of the subject image data and the predetermined distance are registered.

On the other hand, if a normal pixel P was detected on both sides within the predetermined distance across the target pixel O along the one search line L1 (YES at step #07), then, the interpolation value H for the target pixel O for this search direction L along which the normal pixels were detected is calculated (step #08). The method of this calculation of the interpolation value H for the target pixel O can be a method for deductively obtaining a pixel value which would be expected to be obtained if the target pixel O were not defective. One specific example of such method is the linear interpolation method. Specifically, for calculating the interpolation value H for the target pixel O by using the pixel values of the normal pixels P1, P2 located on the opposed sides across the target pixel O along the one search line L1 shown in FIG. 11, for each of the R, G, B color components, the pixel values of the normal pixels P1, P2 located on the opposed sides across the target pixel O along the one search line L1 are connected to each other via a straight line. Then, a value on this straight line corresponding to a ratio of distance from the target pixel O to the normal pixel P1 or P2 will be calculated by the linear interpolation technique, whereby for the target pixel O, interpolation values H1*r*, H1*g*, H1*b* will be obtained for the respective color components of R, G, B. In the graph of FIG. 12, the vertical axis represents a pixel value of each pixel (for one of the R, G, B components) and the horizontal axis represents a positional relationship of each pixel located on the search line L. An example of the mathematical formula for obtaining the interpolation value H for the target pixel O relating to this embodiment is indicated as Formula (1) below, taking the R component for example from the R, G, B components.

$$Hr_{agl,m,n} = \frac{rad\ 1}{rad\ 1 + rad\ 2} \times (Rdat\ 1 - Rdat\ 2) + Rdat\ 2 \quad (1)$$

In the above, Rdat1 is a value obtained by effecting a logarithmic conversion of the pixel value for the R component of the one normal pixel P1 located across the target pixel O, Rdat2 is a value obtained by effecting a logarithmic conversion of the pixel value for the R component of the other normal pixel P2 located across the target pixel O, rad1 is the absolute value of the distance from the target pixel O to the normal pixel P1, rad2 is the absolute value of the distance from the target pixel O to the normal pixel P2, "agl" denotes the angle of each of the plurality of search lines L extending through the target pixel O which has a value of the angular interval determined step #04. In this example, the logarithmic conversion effected on the pixel value for the R component for the normal pixels P1, P2 employs natural logarithm using "e" as the base number of the logarithm. Instead, the common logarithm may be employed. Also, in the above method, the values obtained by effecting the logarithmic conversion on the pixel values of the normal pixels P1, P2 are employed. Instead, the subsequent calculation may be effected by directly using these pixel values.

For the G component and the B component, their interpolation values H1g and H1b can be calculated by the same method as above. Incidentally, the calculation method of the interpolation value H for the target pixel O is not limited to the linear interpolation technique described above. Instead, any other type of interpolation technique can be employed as long as such other technique can also deductively obtain a pixel value which would be expected to be obtained if the target pixel O were not defective.

Next, by using the pixel values of the normal pixels P detected at step #06, a weight coefficient W for the search line L along which the normal pixels P were detected is calculated (step #09). As will be detailed later, this weight coefficient W for one search line L1 is a coefficient for determining to what degree the interpolation value H of the target pixel O calculated for the one search line L1 at step #08 is to be used (or reflected) in a final correction value (weighted average value A) relative to interpolation values H of this target pixel O calculated for the other search lines L. Namely, this coefficient is used for determining the reliability (degree of appropriateness) of the interpolation value H of the target pixel O for each search line L.

In general, in case the pixel values of the normal pixel P1, P2 located on the opposed sides across the target pixel O along one search line L are distant from each other, there is high possibility of an image boundary, i.e. color-to-color transition in that image, being present between the normal pixel P1 and the normal pixel P2. Conversely, if the pixel value of the normal pixel P1 is near the pixel value of the normal pixel P2, the opposite is true. Namely, the possibility is higher of no such boundary, edge or the like being present between the normal pixel P1 and the normal pixel P2. In such case, it is believed that an interpolation value H of the defective pixel interpolated in a direction along an image boundary, edge or the like is more "appropriate" than an interpolation value H of this defective pixel interpolated along a direction intersecting such image boundary, edge or the like. This is because appropriate assumption (deduction) of a pixel value of a target pixel O (a defective pixel) by the linear interpolation technique or the like is difficult if this defective pixel is present between normal pixels in a direction along which the pixel value varies greatly, whereas an appropriate interpolation value of the target pixel O can be relatively easily deduced in the case of interpolation in a direction along the pixel value does not greatly vary.

Then, in the instant embodiment, either the pixel value of the normal pixel P1 and the pixel value of the normal pixel P2, whichever the greater, is used as a denominator and whichever the smaller is used a numerator. And, a ratio thereof is calculated for each of the R, G, B components, whereby weight coefficients Wr, Wg, Wb are obtained. With this, there is obtained such a weight coefficient W as will provide a greater weight as the pixel value of the normal pixel P1 and the pixel value of the normal pixel P2 are nearer to each other. An example of the mathematical formula for obtaining the weight coefficient W relating to this embodiment is indicated as Formula (2) below, taking the R component for example from the R, G, B components.

$$Wr_{agl,m,n} = \frac{\min(Rdat\ 1, Rdat\ 2)}{\max(Rdat\ 1, Rdat\ 2)} \quad (2)$$

where max (Rdat 1, Rdat 2) represents the value of Rdat 1 or Rdat 2, whichever is the greater and min (Rdat 1, Rdat 2) represents the value of Rdat 1 or Rdat 2, whichever is the smaller and Wragl, in, n represents the weight coefficient for that search line L. Incidentally, if the values of the Rdat 1 and Rdat 2 are both "0", in order to prevent the calculation from becoming impossible, the operation will be effected for setting Wragl, m, n to "1". For the G component and the B component, the interpolation values Hg and Hb can be calculated by the same method as above.

Also, the calculation method of the weight coefficient W for the search line L is not limited to the technique described above. Instead, for each of the R, G, B components, an absolute value of the difference between the pixel value of the normal pixel P1 and the pixel value of the normal pixel P2 may be obtained and then, a complement of this absolute value relative to a predetermined value α may be divided by the predetermined value α, thereby to obtain the weight coefficients Wr, Wg, Wb. An example of such alternative calculation method of the weight coefficient W is represented by the following Formula (3), by taking the component R for example from the respective components R, G, B.

$$Wr_{agl,m,n} = \frac{\alpha - |Rdat\ 1 - Rdat\ 2|}{\alpha} \quad (3)$$

where preferably the predetermined value α can be set as a possible maximum value of the absolute value of the difference between the pixel value of the normal pixel P1 and the pixel value of the normal pixel P2. With this, the weight coefficient W can provide the greater weight, the closer the pixel values of the normal pixels P1, P2 each other. The value of the predetermined value a is not limited to the above. Instead, this may be a value smaller than the possible maximum value of the absolute value of the difference between the pixel value of the normal pixel P1 and the pixel value of the normal pixel P2. In that case, however, the complement can have a negative value. Therefore, there will be needed a condition for setting the weight coefficient W to "0", in case the complement is smaller than "0". Further, in the above example, the complement is divided by the predetermined value α, so that the weight coefficient W can have a value greater than "0" and smaller than "1". Instead, the complement can be directly used as the weight coefficient W, without being divided by the predetermined value α.

Next, the process determines whether the operations from step #06 to step #09 have been completed for all of the plurality of search lines L extending through the target pixel O and set according to the angular interval between the adjacent lines L at step #04 (step #10). Then, if the operations at steps #06 through #09 have not yet been completed for all of the plurality of search lines L (NO at step #10), the process returns to step #06, so as to select a further search line L than those lines L for which the operations have been completed and to effect the operations from step #06 to step #09 again.

On the other hand, if it is determined that the operations at steps #06 though #09 have been completed for all the plural search lines L (YES at step #10), a weighted average value A for the one target pixel O selected at step #05 is calculated (step #11). That is, by using the interpolation value H for the target pixel O and the weight coefficient W for each search line calculated at steps #03 through #09, a weighted average value A of the interpolation value H for the selected one target pixel O will be calculated. Specifically, for each of the R, G, B components, first, the interpolation value H for each search line L is multiplied by the weight coefficient W for that search line L raised to the n-th power. Such product value as above will be obtained for all of the plurality of search lines L extending through the target pixel O. These product values will be added up to obtain a sum value. Then, this sum value will be divided by a sum of the weight coefficients W raised to the n-th power employed in the calculation of the multiplication operations. An example of this calculation method of the weighted average value A may be represented by the following Formula (4), by taking the R component of the components R, G, B for example.

$$Ar_{m,n} = \frac{\sum_{agl=0}^{180}(Hr_{agl,m,n} \times Wr_{agl,m,n}^{20})}{\sum_{agl=0}^{180} Wr_{agl,m,n}^{20}} \quad (4)$$

In this embodiment, "n" has a value of 20 for example. And, the total 12 (twelve) search lines L extending through the target pixel O are set by the angular interval of 15 degrees. And, for the respective R, G, B components, the interpolation values Hr, Hg, Hb and the weight coefficients Wr, Wg, Wb have been calculated. Therefore, the weighted average value A will be calculated by dividing the sum of the twelve product values of the interpolation values H and the weight coefficients W raised to the n-th power by the sum of twelve weight coefficients W raised to the n-th power.

In this, since the weight coefficient W has a value greater than "0" and smaller than "1", by raising the weight coefficient to the n-th power, the value of the weight coefficient W can be further "enhanced". With such "enhancement" of the weight coefficients, it is possible to increase the effect of the interpolation value of the target pixel O calculated in the direction where the image boundary, edge, a pattern or the like is present, to be exerted on the weighted average value A. As a result, the interpolation correction of the defective pixel can be carried out appropriately with reflecting presence of such image boundary, edge, pattern or the like. In this respect, the appropriate value of "n" will differ, depending on the condition of the image to be corrected. Therefore, ideally, this value should be experimentally obtained based on statistic data of various image data. In general, however, if this value of "n" is too small, this will result in blurring of the boundary, edge of the like in the final corrected image. Conversely, if this value of "n" is too large, this will result in excessive sharpness of the boundary, edge or the like. Therefore, in practice, in the case of a standard photography, the appropriate value of "n" ranges from 10 to 30 approximately. Further, for appropriate correction of a boundary between a flesh color and black, the appropriate value of "n" will often be about 20.

Next, by using the weighted average value A for the target pixel O calculated at step #11, correction of the target pixel O is effected s(step #12). Specifically, first a reverse logarithmic conversion will be effected on each of the weighted average values Ar, Ag, Ab for the target pixel O calculated for the respective components R, G, B, and the resultant values will be used as final correction values Fr, Fg, Fb for this target pixel O. Then, the pixel values of the target pixel O for the respective R, G, B components will be replaced by the respective final correction values Fr, Fg, Fb. An example of the calculation method of this final correction value F may be represented by the following Formula (5) by taking the R component of the components R, G, B for example.

$$Fr_{m,n} = e^{Ar_{m,n}} \quad (5)$$

The reason why the reverse logarithmic conversion of the weighted average value A for the target pixel O is done first in the calculation of the final correction value F is that at step #08, the logarithmic conversion of the pixel values of the R component of the normal pixels P1 and P2 was effected in the calculation of the interpolation value H for the target pixel O. Therefore, here, the reverse logarithmic conversion is effected with the base number "e" of the natural logarithm. Incidentally, in case the above Formula 1 directly employed the pixel values of the normal pixels P1, P2 without their logarithmic conversions, no such reverse logarithmic conversion will be effected. Hence, the weighted average values Ar, Ag, Ab of the target pixel O will be used directly as the final correction values.

Next, the process determines whether the operations from step #05 through step #12 have been completed by selecting as the target pixels O all of the defective pixels registered in the normal/defective map or not (step #13). If it is determined that the operations have not yet been completed with selection of all the defective pixels as the target pixels O (NO at step #13), the process returns to step #05 to effect the operations from step #03 to step #12 again. Whereas, if it is determined that the operations have been completed with selection of all the defective pixels as the target pixels O (YES at step #13), the correction operation of the defective pixels by the image processing apparatus 1 is terminated.

In the foregoing embodiment, a defective pixel defective due to a base scratch and a defective pixel defective due to an emulsion scratch are corrected first automatically by means of both the bright adjustment technique and the interpolation technique, respectively and then through the additional correction setting screen, the operator manually selects a pixel which is desired to be further corrected by the interpolation technique to be corrected additionally. Instead, the automatic correction may be effected only on the defective pixel defective due to a base scratch by the brightness adjustment and the correction of a defective pixel due to an emulsion scratch may be effected later on a pixel which the operator has selected through the additional correction setting screen. Such alternative construction too is understood to be encompassed within the scope of the present invention. This construction is substantially same as a variation of the foregoing embodiment construction with omission of the operation for automatically correcting a defective pixel through the interpolation by using the second defective pixel map created by the determination of defective pixels based on the second criterion.

The invention claimed is:

1. A method for correcting one or more of defective pixels present in visible light image data, the one or more of pixels being determined as defective by using the visible light image data read from a photographic film based on a visible light and infrared light image data read from the film based on an infrared light, the method comprising the steps of:
   (a) determining one or more of defective pixels based on a first criterion and creating a first defective pixel map;
   (b) correcting the one or more of defective pixels by luminance adjustment using the first defective pixel map;
   (c) determining one or more of defective pixels based on a second criterion which is more strict than said first criterion and creating a second defective pixel map;
   (d) correcting the one or more of defective pixels using the second defective pixel map;
   (e) generating and displaying an additional correction setting screen including a visible light image based on corrected visible light image data and an indicator indicative of a quasi-defective pixel area expanded from an area of the one of more defective pixels;
   (f) creating an additional correction target pixel map which specifies one or more of additional correction target pixels manually set through the additional correction setting screen within the quasi-defective pixel area; and
   (g) correcting the one or more of additional correction target pixels by interpolation.

2. A method for correcting one or more of defective pixels present in visible light image data, the one or more of pixels being determined as defective by using the visible light image data read from a photographic film based on a visible light and infrared light image data read from the film based on an infrared light, the method comprising the steps of:
   (a) determining one or more of defective pixels based on a first criterion and creating a first defective pixel map;
   (b) correcting the one or more of defective pixels by luminance adjustment using the first defective pixel map;
   (c) determining one or more of defective pixels based on a second criterion and creating a second defective pixel map;
   (d) correcting the one or more of defective pixels using the second defective pixel map;
   (e) generating and displaying an additional correction selling screen including a visible light image based on corrected visible light image data and an indicator indicative of a quasi-defective pixel area expanded from an area of the one or more defective pixels, the quasi-defective pixel area being determined based on a criterion less strict than said first and second criteria;
   (f) creating an additional correction target pixel man which specifies one or more of additional correction target pixels manually set through the additional correction setting screen within the quasi-defective pixel area; and
   (g) correcting the one or more of additional correction target pixels by interpolation.

3. The method according to claim 1, wherein said second criterion and said indicator indicative of the quasi-defective pixel area is one of a contour or a coloring of an area obtained by extending an area of the defective pixels determined based on said first criterion.

4. The method according to claim 2, wherein said indicator indicative of the quasi-defective pixel area is one of a contour or a coloring of an area obtained by extending an area of the defective pixels.

5. The method according to claim 3, wherein said additional correction setting screen further includes an indicator indicative of the area of the defective pixels determined based on the first criterion and a further indicator indicative of the area of the defective pixels determined based on the second criterion.

6. The method according to claim 3, wherein the extension of the area of the defective pixels determined based on the first criterion is effected based on at least one of an image size and an image resolution.

7. An image processing apparatus including instructions executable by a processing unit for correcting one or more of defective pixels present in visible light image data, the one or more of pixels being determined as defective by using the visible light image data read from a photographic film based on a visible light and infrared light image data read from the film based on an infrared light, the apparatus comprising:
   the processing unit;
   a memory capable of communicating with said processing unit and storing the image data;
   said instructions executable by the processing unit including the steps of:
   (a) determining one or more of defective pixels based on a first criterion and creating a first defective pixel map;
   (b) correcting the one or more of defective pixels by luminance adjustment using the first defective pixel map;
   (c) determining one or more of defective pixels based on a second criterion which is more strict than said first criterion and creating a second defective pixel map;
   (d) correcting the one or more of defective pixels using the second defective pixel map;
   (e) generating and displaying an additional correction setting screen including a visible light image based on corrected visible light image data and an indicator indicative of a quasi-defective pixel area expanded from an area of the one or more of defective pixels;
   (f) creating an additional correction target pixel map which specifies one or more of additional correction target pixels manually set through the additional correction setting screen within the quasi-defective pixel area; and
   (g) correcting the one or more of additional correction target pixels by interpolation.

8. An image processing apparatus including instructions executable by a processing unit for correcting one or more of defective pixels present in visible light image data, the one or more of pixels being determined as defective by using the visible light image data read from a photographic film based on a visible light and infrared light image data read from the film based on an infrared light, the apparatus comprising:
   the processing unit;
   a memory capable of communicating with said processing unit and storing the image data;
   said instructions executable by the processing unit including the steps of:
   (a) determining one or more of defective pixels based on a first criterion and creating a first defective pixel map;

(b) correcting the one or more of defective pixels by luminance adjustment using the first defective pixel map;

(c) determining one or more of defective pixels based on a second criterion and creating a second defective pixel map;

(d) correcting the one or more of defective pixels using the second defective pixel map;

(e) generating and displaying an additional correction setting screen including a visible light image based on corrected visible light image data and an indicator indicative of a quasi-defective pixel area expanded from an area of the one or more defective pixels, the quasi-defective pixel area being determined based on a criterion less strict than said first and second criteria;

(f) creating an additional correction target pixel map which specifies one or more of additional correction target pixels manually set through the additional correction setting screen within the quasi-defective pixel area; and (g) correcting the one or more of additional correction target pixels by interpolation.

9. The image processing apparatus according to claim 7, wherein said indicator indicative of the quasi-defective pixel area is one of a contour or a coloring of an area obtained by extending an area of the defective pixels determined based on said first criterion.

10. The image processing apparatus according to claim 8, wherein said indicator indicative of the quasi-defective pixel area is one of a contour or a coloring of an area obtained by extending an area of the defective pixels.

11. The image processing apparatus according to claim 9, wherein said additional correction setting screen further includes an indicator indicative of the area of the defective pixels determined based on the first criterion and a further indicator indicative of the area of the defective pixels determined based on the second criterion.

12. The image processing apparatus according to claim 9, wherein the extension of the area of the defective pixels determined based on the first criterion is effected based on at least one of an image size and an image resolution.

13. A computer-readable recording medium including instructions, executable by a processing unit, for correcting one or more of defective pixels present in visible light image data, the one or more of pixels being determined as defective by using the visible light image data read from a photographic film based on a visible light and infrared light image data read from the film bated on an infrared light, wherein said instructions include the steps of:

(a) determining one or more of defective pixels based on a first criterion and creating a first defective pixel map;

(b) correcting the one or more of defective pixels by luminance adjustment using the first defective pixel in map;

(c) determining one or more of defective pixels based on a second criterion which is more strict than said first criterion and creating a second defective pixel map;

(d) correcting the one or more of defective pixels using the second defective pixel map;

(e) generating and displaying an additional correction setting screen including a visible light image based on corrected visible light image data and an indicator indicative of a quasi-defective pixel area expanded from an area of the one or more of defective pixels;

(f) creating an additional correction target pixel map which specifies one or more of additional correction target pixels manually set trough the additional correction setting screen within the quasi-defective pixel area; and (g) correcting the one or more of additional correction target pixels by interpolation.

14. A computer-readable recording medium including instructions, executable by a processing unit, for correcting one or more of defective pixels present in visible light image data, the one or more of pixels being determined as defective by using the visible light image data read from a photographic film based on a visible light and infrared light image data read from the film based on an infrared light, wherein said instructions include the steps of:

(a) determining one or more of defective pixels based on a first criterion and creating a first defective pixel map;

(b) correcting the one or more of defective pixels by luminance adjustment using the first defective pixel map;

(c) determining one or more of defective pixels based on a second criterion and creating a second defective pixel map; and (d) correcting the one or more of defective pixels using the second defective pixel map;

(e) generating and displaying an additional correction setting screen including a visible light image based on corrected visible light image data and an indicator indicative of a quasi-defective pixel area expanded from an area of the one or more defective pixels, the quasi-defective pixel area being determined based on a criterion less strict than said first and second criteria;

(f) creating an additional correction target pixel map which specifies one or more of additional correction target pixels manually set through the additional correction setting screen within the quasi-defective pixel area; and (g) correcting the one or more of additional correction target pixels by interpolation.

15. The recording medium according to claim 13, wherein said indicator indicative of the quasi-defective pixel area is one of a contour or a coloring of an area obtained by extending an area of the defective pixels determined based on said first criterion.

16. The recording medium according to claim 14, wherein said indicator indicative of the quasi-defective pixel area is one of a contour or a coloring of an area obtained by extending an area of the defective pixels.

17. The recording medium according to claim 15, wherein said additional correction setting screen further includes an indicator indicative of the area of the defective pixels determined based on the first criterion and a further indicator indicative of the area of the defective pixels determined based on the second criterion.

18. The recording medium according to claim 15, wherein the extension of the area of the defective pixels determined based on the first criterion is effected based on at least one of an image size and an image resolution.

* * * * *

UNITED STATES PATENT AND TRADEMARK OFFICE
CERTIFICATE OF CORRECTION

| | |
|---|---|
| PATENT NO. | : 7,602,987 B2 |
| APPLICATION NO. | : 11/089807 |
| DATED | : October 13, 2009 |
| INVENTOR(S) | : Hisakazu Kuramoto |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 955 days.

Signed and Sealed this

Fifth Day of October, 2010

David J. Kappos
*Director of the United States Patent and Trademark Office*